United States Patent [19]

Hopkins et al.

[11] Patent Number: 4,986,112

[45] Date of Patent: Jan. 22, 1991

[54] COMPOSITE PRESSURE VESSEL FOR A NUCLEAR ENVIRONMENT

[75] Inventors: James R. Hopkins, Oakville; Brian Strachan, Mississauga, both of Canada

[73] Assignee: Atomic Energy of Canada Ltd., Mississauga, Canada

[21] Appl. No.: 409,781

[22] Filed: Sep. 20, 1989

[30] Foreign Application Priority Data

Nov. 2, 1988 [CA] Canada ................................. 581982

[51] Int. Cl.$^5$ ............................................. G01M 3/32
[52] U.S. Cl. ...................................... 73/49.2; 220/435
[58] Field of Search ..................... 73/49.2, 40.5 R, 40; 220/435, 415, 3, 5 A; 138/140

[56] References Cited

U.S. PATENT DOCUMENTS 3,320,969  5/1967  Gordon ........................... 73/49.2 X
3,921,438  11/1975  Katsuta ........................... 73/49.2 X

*Primary Examiner*—Hezron E. Williams
*Assistant Examiner*—Joseph W. Roskos
*Attorney, Agent, or Firm*—R. G. Bitner

[57] ABSTRACT

A pressure vessel for fluids containing hydrogen and subjected to a neutron flux. The vessel comprises an inner sealing layer and an outer load bearing layer. The inner sealing layer is composed of a material having a radiation induced diametral deformation rate higher than that of the outer layer to minimize stresses therein. The outer layer is provided with apertures, and the boundary between the inner and outer layers is non-metallurgical such that any fluid which penetrates the sealing layer will readily pass through the outer layer where it can be detected, by suitable detector before it produces embrittlement of the load bearing layer. The preferred application for the invention is in pressure tubes for a nuclear reactor.

6 Claims, 1 Drawing Sheet

COMPOSITE PRESSURE VESSEL FOR A NUCLEAR ENVIRONMENT

FIELD OF THE INVENTION

This invention relates to a pressure vessel for fluids containing hydrogen and subjected to a neutron flux, and particularly for use in a system that allows detection of a leak before damage to the load bearing component of the vessel can occur.

BACKGROUND OF THE INVENTION

One of the problems associated with the pressure tubes of a CANDU (CANadian Deuterium moderated Uranium) fuel reactor is the risk of delayed hydrogen cracking (DHC) of the material due to the presence of hydrogen and stress. The term "hydrogen" as used herein includes the isotopes of hydrogen, such as deuterium. A cracking problem occurs generally in pressure vessels containing hydrogen. In present CANDU reactors, pressure tubes are mointored for the rate of hydrogen ingress, and evaluated for the risk of DHC. If the risk becomes too high, or if the tube leaks, they are replaced. The monitoring and replacement of pressure tubes involves considerable time and expense. for non-nuclear applications, pressure vessels for containing hydrogen have been proposed that use an inner layer that has reduced susceptibility to embrittlement by hydrogen but does not prevent the migration of hydrogen which is vented through openings in the outer layer. Such multi-layer vessels are made with a shrink or interference fit that produces compressive forces in the inner layer. These shrink fit type vessels would not be suitable when subjected to a neutron flux. Such environment produces radiation induced creep and growth, hereinafter referred to as deformation, of the load bearing layer and results in tensile stresses in the inner layer which may lead to delayed hydrogen cracking (DHC) of th inner sealing layer. A crack in the sealing layer may permit high local concentrations of hydrogen in the underlying load bearing layer and may lead to non-ductile failure of the vessel.

In the case of pressure tubes for a nuclear reactor, the design is made more difficult by the desirability of using material with a low neutron absorption cross section, and good in reactor corrosion resistance.

SUMMARY OF THE INVENTION

An object of the present invention is to provide a pressure vessel for fluids containing hydrogen and subjected to a neutron flux, which has a reduced susceptibility to non-ductile failure, and which provides for leak-before-break operation.

The pressure vessel of the present invention comprises an inner sealing layer; an outer load bearing layer; said inner sealing layer being composed of a material having a radiation induced diametral deformation rate higher than that of the outer layer, under operating conditions, to minimize stresses in the inner layer; the inner and outer layer being non-metallurgically joined to one another to define an interface permeable to fluid and inhibit crack propagation from the inner to outer layer; the outer load bearing layer having a plurality of spaced apertures to allow passage of fluid penetrating the sealing layer.

DESCRIPTION OF PREFERRED EMBODIMENTS

Figure 1:
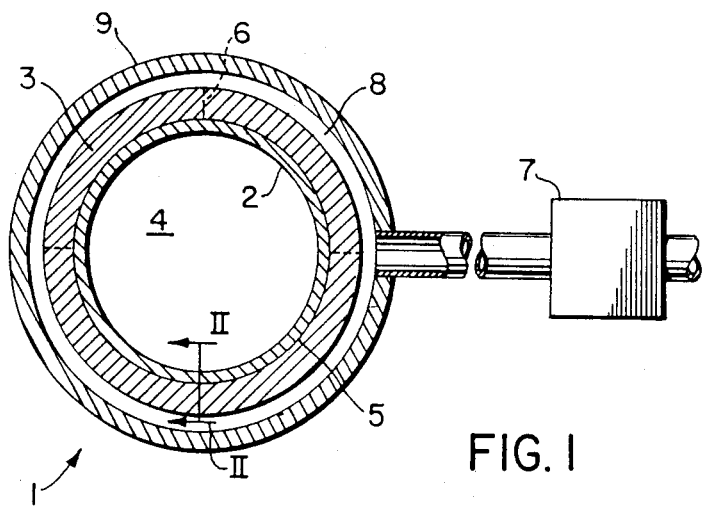
FIG. 1 is a schematic cross-sectional view of a pressure vessel in accordance with the present invention.
Figure 2:
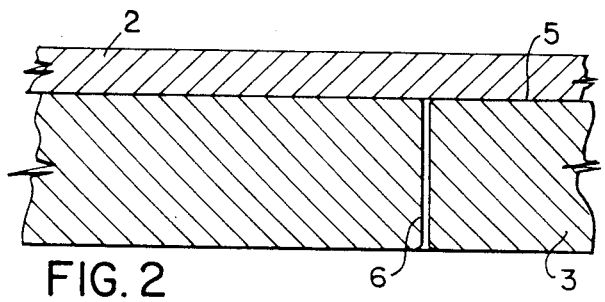
FIG. 2 is an enlarged fragment of a section taken at 1—1 of FIG. 1 showing details of vessel construction.

With reference to FIGS. 1 and 2, the pressure vessel 1 comprises an inner sealing layer 2 and an outer load bearing layer 3.

The inner layer 2 is constructed of a material resistant to corrosion from the contained high temperature, high pressure fluid 4. Also, the material for the inner layer is selected to have a radiation induced diametral deformation rate higher than the outer layer under operating conditions.

In the preferred application, namely as pressure tubes for a nuclear reactor, the material for the inner layer will be chosen to also provide wear and corrosion resistance, and to have low neutron absorption.

The inner and outer layer are non-metallurgically joined to one another to form an interface 5 that is permeable to fluid in the plane of the interface. The interface 5 also defines a discontinuity between the inner and outer layers to inhibit crack propagation across the interface.

The outer load bearing member 3 is provided with apertures 6 that allow passage of any fluid that penetrates the sealing layer 2. The apertures 6 should be no larger than necessary to allow passage of escaping fluid, and shaped, eg. rounded, so as to minimize stress concentrations, and thereby minimize adversely affecting the fracture resistance of the load bearing layer 3. The spacing of the apertures is chosen to provide an the acceptable detection time taking into account the rate at which any fluid that has penetrated the sealing layer 2 will travel along the interface 5.

Figure 3:
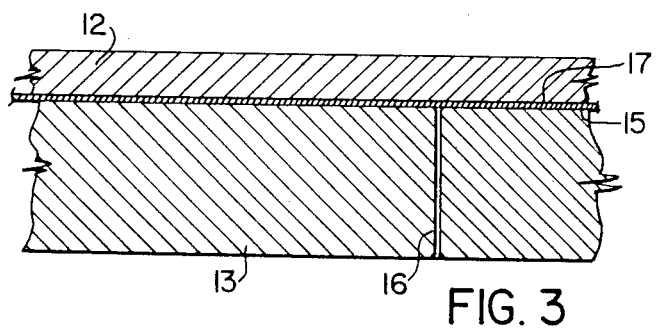
FIG. 3 illustrates another embodiment incorporating a barrier layer.

With reference to FIG. 3, disposed between the inner layer 12 and outer layer 13, at the interface 15, there may be provided an intermediate hydrogen barrier or sink layer 17. The barrier or sink layer 17 may be in the form of a separate layer, or in the form of a oxide layer on the inner and/or outer layers. Whatever the arrangement of the barrier or sink layer, there must be provided, as indicated above, an interface between the inner and outer layers permeable to fluid so as to provide a passageway for escaping fluid to one or more of the apertures 16. In the embodiment as shown in FIG. 3, the barrier or sink layer 17 is metallurgically bonded to the inner layer 12, but non-metallurgically bonded to the outer layer 13 to define an interface 15 permeable to fluid.

With reference to FIG. 1, disposed outside the pressure vessel, is shown a leak detector 7 which communicates with the enclosure 9, that encloses the pressure vessel 1.

In operation, the provision of a higher deformation (eg.creep) rate of the inner layer 2 provides that the inner layer will creep into the outer layer 3 so that the outer layer carries substantially all the load. Since the inner layer is not subjected to high stresses, cracking of the inner sealing layer 2 is unlikely to occur. Because of the discontinuity provided at the interface 5 between the inner and outer layers, a crack in the inner layer will be prevented from propagating into the outer layer. Because of the reinforcement provided by the outer tube, a crack in the inner tube cannot become unstable. However, if a crack does appear in the inner layer, the underlying outer layer becomes subject to hydriding from the hydrogen in the fluid. Hence it is desired that any break in the inner layer be detected before damage to the load bearing layer 3 can occur. leak detection is facilitated by providing that any fluid which penetrates the sealing layer will pass quickly through the outer layer where it can be detected, before damage to the outer layer can occur. Since the interface 5 between the inner and outer layers is not metallurgically bonded, any fluid which penetrates the sealing layer can pass along the interface 5 to one or more apertures 6. After passing through the apertures 6, the escaped fluid can be detected.

With reference to FIG. 1, leak detection is shown provided by removing fluid 8 from the enclosure 9 surrounding the pressure vessel 1, and detecting for any escaped fluid 4 by suitable detection means 7.

EXAMPLE

Following are details of a design of a pressure tube suitable for a CANDU reactor incorporating the present invention.

The pressure tube has a diameter of approximately 10 cm. The outer load bearing layer is made of cold-worked Zr-2.5 wt % Nb and is approximately 4 mm thick . The inner layer may be made of Zircaloy-4 or Zr-2.5 wt % Nb with a thickness of 1 mm. The above materials for the inner layer have a higher deformation rate than the material selcted for the outer layer, under the operating conditions of the reactor. A barrier layer made of materials such as metallic Aluminum or Zirconium oxide ceramic approximately 0.1 to 0.2 mm thick is provided on the outside of the inner layer.

The apertures in the outer load bearing layer have a diameter of approximately 1 mm and are spaced longitudinally approximately 30 cm apart longitudinally along the tube in diametrically opposed staggered pairs.

The detection of coolant leakage is provided by a detector 7, such as a dew-point measuring device, placed to receive circulated gas from the annulus between the pressure tube 1 and calandria tube 9 of the reactor.

We claim:

1. A pressure vessel for fluids containing hydrogen and subjected to a neutron flux, comprising;
   an inner sealing layer substantially impervious to hydrogen;
   an outer load bearing layer;
   said inner layer being composed of a material having a radiation induced diametral deformation rate higher than that of the outer layer, to minimize stresses in the inner layer in operation;
   said inner and outer layer being non-metallurgically joined to one another to define an interface permeable to fluid and inhibit crack propagation from the inner to outer layer;
   said outer load bearing layer having a plurality of spaced apertures to allow passage of any fluid penetrating the sealing layer.

2. The pressure vessel of claim 1, further comprising an intermediate layer disposed between said inner and outer layers which provides a barrier or sink to hydrogen.

3. The pressure vessel of claim 2, wherein the intermediate layer is integrally attached to one of the inner or outer layers.

4. The pressure vessel of claim 1, wherein the inner and outer layers are composed of materials having low neutron absorption.

5. The pressure vessel of claim 1, in combination with detection means disposed outside of the vessel for detecting the presence of excaped fluid and therby indicating failure of the sealing layer.

6. The apparatus of claim 1, wherein the pressure vessel is a pressure tube for a nuclear reactor.

* * * * *